Nov. 19, 1968   E. HENRY-BIABAUD   3,411,834
BRAKING SYSTEMS OF ARTICULATED VEHICLES
Filed May 3, 1967
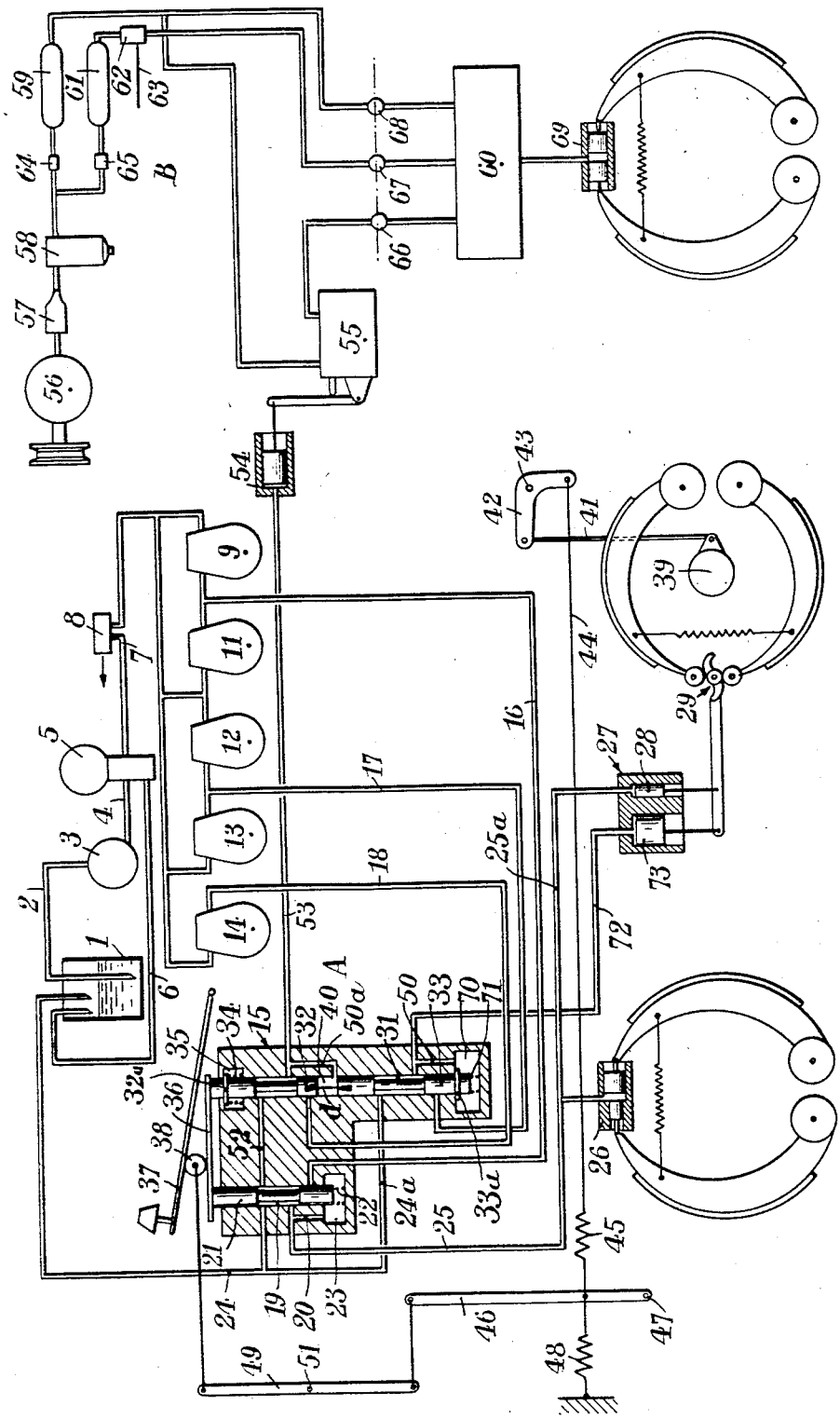

United States Patent Office 3,411,834
Patented Nov. 19, 1968

3,411,834
BRAKING SYSTEMS OF ARTICULATED VEHICLES
Edmond Henry-Biabaud, Paris, France, assignor to Société Anonyme André Citroen, Paris, France, a French body corporate
Filed May 3, 1967, Ser. No. 635,799
Claims priority, application France, May 9, 1966, 60,792
6 Claims. (Cl. 303—7)

ABSTRACT OF THE DISCLOSURE

Braking system for articulated vehicles of the type comprising a tractor to which a trailer or semitrailer can be coupled, which incorporates a brake distributor comprising three distributor slide valves movable in three separate bores, characterised in that the compensator bar of the brake distributor engages the outer ends of the first and second slide valves controlling the front brake cylinders of the tractor and the trailer braking circuit respectively, the roller of said brake distributor located between said first and second slide valves is nearer to the first slide valve, when the rear axle of the tractor is unloaded, than when said axle is loaded, said roller being moved to said second slide valve when the load on said rear axle increases, the second bore wherein the second slide valve is located, communicating with a pipe line connected to the actuator of a normally closed valve inserted in the trailer braking circuit and controlling the supply of braking fluid to the trailer brakes, the working chamber of the third bore wherein the third slide valve is located, communicating with said last-mentioned pipe line.

Background of the invention

The present invention relates to braking systems of articulated vehicles.

Braking systems designed for articulated vehicles are already known which are so arranged that when the brake pedal is depressed by the driver the trailer brakes are applied before those of the tractor vehicle. In a known system of this character, such as described notably in the German Patent No. 762,151, the trailer brakes and those of the front and rear axles of the tractor are supplied through a same and single circuit, and therefore this system is definitely unreliable. In fact, in case of failure in the braking circuit all the brakes become inoperative and under these conditions very serious accidents are most likely to occur. Moreover, in a device of this type the tractor brakes are applied under the same conditions, whether the trailer is coupled or not thereto.

Other braking systems of articulated vehicles are also known which comprise two separate braking circuits, namely one for the tractor and one for the trailer. Another known system incorporates a brake distributor adapted to apportion the braking force among three axles, notably two axles of a tractor and one axle of a semitrailer coupled to said tractor. This brake distributor is described in the U.S. Patent No. 3,284,141. This brake distributor comprises three slide valves of the reaction type of which two control the application of the tractor brakes, the third one controlling the semitrailer brakes. This distributor incorporates a first compensator bar reacting against the two slide valves controlling the actuation of the brakes mounted on the two axles of the tractor, a roller moving automatically along the first compensator bar as a function of the tractor load, and a second compensator bar acting upon said roller and also upon the third slide valve controlling the brakes of the semitrailer axle, this other compensator bar being responsive to the pressure exerted by the driver on the brake pedal.

However, the brake distributor broadly described hereinabove is unsuitable for producing the optimum brake application under all service conditions, notably introducing a time-lag in the braking efforts exerted on the semitrailer brakes and on the tractor brakes.

Summary of the invention

It is the essential object of the present invention to provide a braking system for articulated vehicles which is particularly simple in design and construction, and extremely reliable in operation.

To this end, the braking system for articulated vehicles of the type comprising a tractor to which a trailer or semitrailer can be coupled, which incorporates separate braking circuits for the tractor and for the trailer, the trailer braking circuit comprising first, second and third separate sources of fluid under pressure, a brake distributor comprising three distributor slide valves movable in three separate bores, respectively a first slide valve movable in a first bore communicating with the first source of fluid under pressure and the front brake cylinders of the tractor, a second slide valve movable in a second bore communicating with said second source of fluid under pressure and the trailer braking circuit, and a third slide valve movable in a third bore communicating with said third source of fluid under pressure and the rear brake cylinders of the tractor, this brake distributor further comprising a compensator bar to which the braking effort applied to the brake pedal is transmitted through the medium of a roller of which the position is subordinate to the load carried by the rear axle of the tractor, said compensator bar acting upon two slide valves of said brake distributor in order to vary the apportioning of the braking effort among the front and rear brakes of the tractor as a function of the load carried by the rear axle of said tractor, this system being characterized in that the compensator bar of said brake distributor engages the outer ends of said first and second slide valves, the roller of said brake distributor located between said first and second slide valves is nearer to the first slide valve, when the rear axle of the tractor is unloaded, than when said axle is loaded, said roller being moved to said second slide valve when the load on said rear axle increases, said second bore communicating with a pipe line connected to the actuator of a normally closed valve inserted in the trailer braking circuit and controlling the supply of braking fluid to the trailer brakes, the working chamber of said third bore communicating with said last-mentioned pipe line.

The braking system according to the present invention provides an optimum brake application under all circumstances. In fact, when the trailer or semitrailer is not coupled to the tractor, the rear axle of the tractor is unloaded and the braking system, due to the fact that the first slide valve opens first, causes a greater braking effort to be applied to the front axle than to the rear axle. In fact, as the rear axle is unloaded the braking force required therefor is considerably lower.

On the other hand, when the trailer is coupled to the tractor the braking system will firstly apply the trailer brakes and the front axle brakes and then the rear axle brakes of the tractor with a considerable braking force.

The braking system according to this invention is advantageous in that it comprises three separate brake circuits for braking the trailer and the tractor, whereby in case of failure of one or two of these circuits the other circuits or circuit can always be relied upon for braking the articulated vehicle. Therefore, the safety of operation is improved considerably.

Brief description of the drawing

A typical form of embodiment of the present invention will now be described by way of example with reference to the single figure of the accompanying drawing, which is a diagram of the braking system.

Description of the preferred embodiment

In this form of embodiment the braking system comprises essentially a hydraulic circuit A for controlling the tractor brakes and a pneumatic circuit B for controlling the trailer or semitrailer brakes.

The pneumatic circuit B may be either of the compressed-air type as shown in the drawing, or of the vacuum type. The hydraulic brake circuit of the tractor comprises a reservoir 1 adapted to supply hydraulic fluid through a pipe line 2 to the suction side of a pump 3 of the high-pressure type, the delivery side of this pump 3 being connected through another pipe line 4 to a make-and-brake or main accumulator 5 connected to the reservoir 1 through a return line 6. The main accumulator 5 is connected in parallel through a pipe line 7, having inserted therein a minimum pressure pick-up device 8 connected to a tell-tale lamp (not shown), to a series of five accumulators 9, 11, 12, 13 and 14. These five accumulators are connected in turn to a brake distributor 15, accumulators 9 and 11 in common via a high-pressure pipe line 16, accumulators 12 and 13 in common via a high-pressure pipe line 17, and accumulator 14 via a high pressure pipe line 18, as shown. Accumulators 9 and 11 constitute a source of fluid under pressure for actuating the front brakes of the tractor, accumulators 12 and 13 constitute a similar source for the rear brakes of the tractor, and accumulator 14 constitutes a source of fluid under pressure for actuating the braking circuit of the trailer.

The high-pressure pipe line 16 opens into a first bore 19 formed in the body of brake distributor 15, a first slide valve 21 being slidably mounted in said bore 19 for controlling the front brakes of the tractor. This slide valve 21 is urged upwards by a spring 22 housed in a chamber 23, as shown in the drawing. In the inoperative or closed position of said slide valve 21, as shown in the figure, this slide valve permits the communication between a return or exhaust line 24 leading to the reservoir 1, and another pipe line 25. This pipe line 25 communicating with the chamber 23 of distributor 15 through a duct 20 is connected to the front brake cylinders shown diagrammatically in the drawing as comprising a single cylinder 26, and also through the medium of another duct 25a to a bore of relatively reduced cross-sectional area of each rear brake cylinder 27, this small bore having slidably mounted therein a small piston 28 operatively connected to the rear brake control device designated in block form by the reference numeral 29.

The brake distributor 15 also comprises another or second bore 31 somewhat longer than and parallel to bore 19. Slidably mounted in this bore 31 are two separate distributor slide valves 32 and 33. Slide valve 32 controlling the trailer brakes is urged to its inoperative or closed position, that is, in the upper position as shown in the drawing, by a spring 34 housed in a chamber 35 of brake distributor 15, this spring reacting against a shoulder or flange 32a of slide valve 32 which is pressed against the upper or end wall of chamber 35. A compensator bar 36 bears against the upper ends of slide valves 21 and 32, and brake pedal 37 acts upon said compensator bar 36 through the medium of a roller 38 the position of which is adjustable as a function of the load carried by the rear axle of the tractor.

The corrector mechanism operating as a function of the axle load is well known per se and therefore it is shown only diagrammatically in the drawing. It comprises, from the rear axle 39, a rod 41 attached to this rear axle and to a bell-crank lever 42 fulcrumed at 43 on the frame structure or chassis of the tractor, a cable 44 anchored at one end to lever 42 and at the other end, by means of a spring 45, to another lever 46 fulcrumed at 47 on the tractor frame or chassis, this lever being responsive in turn to a return spring 48 attached to the frame or chassis, and a third lever 49 fulcrumed at 51 on the tractor frame and having its lower end, as shown, connected to the upper end of lever 46, the upper end of lever 49 being attached to the aforesaid roller 38. In the drawing the roller 38 is shown in the position corresponding to the unloaded condition of the rear axle of the tractor, that is, when the trailer or semitrailer is not coupled thereto. In this position, the roller 38 is nearer to slide valve 21 than to slide valve 32.

The high-pressure pipe line 18 and a return duct 52 leading to the reservoir 1 open into the portion of the common bore 31 which receives the slide valve 32. In the inoperative position of slide valve 32 the return duct 52 communicates with a pipe line 53 connected to a hydraulic actuator 54 controlling a compressed-air valve 55 inserted in the compressed-air braking circuit B of the trailer. This braking circuit is well known per se and comprises essentially a compressor 56, a pressure regulating device 57, an anti-freeze device 58, a compresed-air reservoir 59 for the main brake and the automatic brake operation, another reservoir 61 for the emergency brake and an emergency brake valve 62 actuated by a mechanical control member 63 connected to the hand brake control member. Non-return valves 64 and 65 are provided upstream of reservoirs 59 and 61.

The air valve 55 is branched off the outlet of the main brake reservoir 59 and connected to a union 66 for the direct supply of compressed air to the trailer brakes. Another connecting union 67 leads to the outlet of the emergency brake valve 62, and a third union 68 is connected directly to the outlet of the main reservoir 59 for permitting the automatic brake operation. These three unions or tappings 66, 67 and 68 are connected to the device 60 controlling the trailer brake cylinders 69 when the trailer is coupled to the tractor.

The third distributor slide valve 33 (controlling the rear brakes of the tractor) is housed in the section of bore 31 into which leads the high-pressure pipe line 17. Slide valve 33 projects somewhat into a chamber 70 formed in the body of the brake distributor body 15 and connected through a duct 50 to a pipe line 72 feeding a bore of relatively large cross-sectional area of the rear brake cylinders 27. Slide valve 33 is responsive to the action of a coil compression spring 71 housed in said chamber 70 and constantly urging said slide valve 33 upwards to its inoperative or closing position in which it is retained by a flange or shoulder 33a of slide valve 33 which engages the upper end face of chamber 70. In its inoperative position the slide valve 33 permits the communication between a return or exhaust pipe line 24a leading to the reservoir 1 and the aforesaid pipe line 72 connected to the large-sectioned bore of the rear brake cylinders 27 in which a piston 73 of corresponding diameter is slidably mounted, this piston controlling in turn the brake mechanism 29. A certain clearance or lost-motion d is provided between the registering faces of the pair of aligned slide valves 32 and 33 in their inoperative position, and the volume 40 formed between these slide valve faces constitutes the working chamber of the third slide valve 33 and communicates with pipe line 53 through a duct 50a.

Now the operation of the braking system of this invention will be described.

Firstly, it will be assumed that the trailer or semi-trailer is not coupled to the tractor and that consequently the rear axle of the tractor is unloaded. Under these conditions, the roller 38 of the load corrector is positioned as shown in the drawing. If the driver depresses the brake pedal, the corresponding effort is transmitted through the roller 38 and distributed by the compensator bar 36 among the two slide valves 21 and 32. Due to the extreme left position of roller 38, slide valve 21 will slide first in its bore 19 to open the communication between the pipe lines 16 and 25. In this case, the pressure in accumulators 9 and 11 is transmitted via these pipe lines 16 and 25 to the front brake cylinders 26 and via pipe line 25a to the small-sectioned bores of the rear brake cylinders 27. Therefore, the greater part of the braking effort is applied to the front axle, a relatively moderate braking effort produced by the small piston 28 acting on the control device 29 being exerted on the rear axle brakes.

On the other hand, if the trailer or semitrailer is coupled to the tractor, that is, if the rear axle of the tractor is loaded, the load corrector mechanism comprising the elements 41 to 51 will shift the roller 38 to the right so that this roller will be nearer to slide valve 32 than to slide valve 21.

Under these conditions, when a braking effort is exerted on the brake pedal 37, slide valve 32 will be depressed against the resistance of its return spring 34. This movement of slide valve 32 (downwards as seen in the drawing) is attended by the opening of the communication between pipe lines 18 and 53. Therefore, the pressure transmitted to the hydraulic actuator 54 through pipe line 53 will open the air valve 55 and cause the trailer brakes to be supplied with compressed air. Thus, the trailer is braked and this brake application takes place, before the tractor brakes are applied, from the very beginning of the braking action.

Thereafter the first slide valve 21 interconnects the pipe lines 16 and 25 so as to supply fluid under pressure to the front brake cylinders 26.

When the pressure in circuit 53 and chamber 40 is sufficient to compress spring 71, the slide valve 33 is moved downwards. This movement opens the communication between pipe linese 17 and 72, so that the two large-diameter bores of the rear brake cylinders 27 receiving the pistons 73 are pressurized. Thus, the rear axle is subjected to a braking force considerably greater than that received in the preceding case, this greater braking force being necessary since the corresponding axle is loaded.

Therefore, when the driver depresses the brake pedal 37 the trailer, the front axle of the tractor and finally the rear axle of the tractor are braked in this order and successively.

The above-described braking system is completely reliable in that it comprises three separate hydraulic circuits, namely a first circuit comprising the elements 9, 11, 16, 21 and 25, a second circuit comprising element 12, 13, 17, 33 and 72, and a third circuit comprising elements 14, 18, 32 and 53, and a pneumatic circuit also separate from the other circuits. This system is extremely dependable for in case of failure of the first and second hydraulic circuits, the trailer brakes can still be actuated by the third circuit (elements 14, 18, 32 and 53). In case of failure of the second and third hydraulic circuits, the front and rear axle brakes are nevertheless adapted to be energized via the first circuit (elements 9, 11, 16, 21 and 25). In case of failure of the first and third hydraulic circuits, the rear axle brakes of the tractor are still adapted to be energized via the second circuit (elements 12, 13, 17, 33 and 72). Finally, in case of failure of the three hydraulic circuits, the emergency brake of the tractor is still available (handbrake controlling the rear brakes) together with the trailor brakes (pneumatic emergency brake 61, 62 and 63).

Of course, the specific form of embodiment described hereinabove with reference to the accompanying drawing should not be construed as limiting the scope of the invention since many modifications may be brought thereto without departing from the spirit and scope of the invention as set forth in the appended claims.

Thus, the braking system of the trailer or semitrailer may be of the vacuum type (such as the Dewandre vacuum servo type), in lieu of the compressed-air type illustrated. In this case the air valve 55 is replaced by a vacuum control valve and compressor 56 is replaced by a suitable source of vacuum (vacuum pump in the case of a diesel engine or induction pipe in the case of a spark-ignition engine).

Similarly, the braking system of this invention is applicable to other types of brakes, notably drum brakes of different design, or disk brakes.

Besides, the basic principle of the braking system of this invention is also applicable to articulated vehicles in which the tractor is equipped with a pneumatic-type braking circuit.

On the other hand, the tractor braking circuit may be simplified by dispensing with the small-sectioned bore portions of the rear brake cylinders 27, together with the pipe line 25a supplying hydraulic fluid to these bores. In this case, the brakes are applied under no-lead conditions only the front brake cylinders 26 are actuated.

Slide valves 32 and 33 may also be disposed in separate bores of brake distributor 15, instead of being disposed tandem-wise in a common bore 31. In this case it is only necessary that the working chamber 40 of slide valve 33 communicates with pipe line 53 controlling the trailer brake operation.

What I claim is:

1. A braking system for articulated vehicles of the type comprising a tractor adapted to have a trailer or semi-trailer coupled thereto, this system comprising a brake pedal on said tractor, front brake cylinders and rear brake cylinders of said tractor, brake cylinders of said trailer, a first braking circuit of said tractor for supplying braking fluid to said front and rear brake cylinders of said tractor and a second braking circuit for supplying braking fluid to said trailer brake cylinders, the tractor braking circuit comprising first, second and third separate sources of fluid under pressure, a brake distributor comprising a body, a first bore in said body which communicates with said first source of fluid under pressure and the front brake cylinders of said tractor, a first distributor slide valve movable in said first bore and having one end projecting externally of said body, a second bore formed in said body, parallel to said first bore and communicating with said second source of fluid under pressure and with said trailer braking circuit, a second distributor slide valve movable in said second bore and having one end projecting externally of said body, a third bore formed in said body which communicates with said third source of fluid under pressure and with said rear brake cylinders of said tractor, a third distributor slide valve movable in said third bore, a compensator bar engaging the outer ends of said first and second distributor slide valves, a roller disposed between said compensator bar and said brake pedal, means for adjusting the position of said roller along said compensator bar as a function of the load carried by the rear axle of said tractor in order to vary the distribution of the braking effort among the front and rear brakes of the tractor as a function of the load carried by the rear axle thereof, said means being so arranged that said brake distributor roller be located nearer to said first distributor slide valve than to said second slide valve when said rear axle is unloaded, and nearer to said second slide valve than to said first slide valve when said rear axle is loaded, a normally closed valve inserted in the trailer braking circuit for controlling the energization of the trailer brake cylinders, a member for actuating said last-named valve and a pipe line connecting said member to said second bore, said pipe line also communicating with said third bore in a zone where the fluid pressure is adapted to control the movement of said third distributor slide valve, said second and third bores being axially aligned to constitute a single and same bore for said second and third distributor slide valves.

2. A braking system as set forth in claim 1, which comprises a high-pressure pump, a main accumulator connected to said pump, and first, second and third accumulators connected to said main accumulator and constituting respectively said first, second and third sources of fluid under pressure.

3. A braking system as set forth in claim 1, which comprises a first high-pressure pipe line connected to said first source of fluid under pressure, a first exhaust pipe line and a pipe line connected to said front brake cylinder, all said pipe lines opening into said first bore, a first chamber in said brake distributor body, the inner end of said first slide valve projecting into said first chamber, said first chamber communicating with the pipe line leading to the front brake cylinders, a first spring housed in said first chamber and urging said first slide valve to its inoperative or closed position, a second high-pressure pipe line and a second exhaust pipe line, said second exhaust pipe line opening, like said pipe line supplying energizing fluid to said normally closed valve controlling the trailer brakes, into said common bore at the location of said first slide valve, a second chamber in said brake distributor body, a second spring urging said second slide valve to its inoperative closed position, a third high-pressure pipe line connected to said third source of fluid under pressure, a third exhaust pipe line and a pipe line connected to said rear brake cylinders, said last-named pipe lines opening into said common bore at the location of said third slide valve, a third chamber in said distributor body, the end of said third slide valve projecting into said third chamber, said third chamber communicating with the aforesaid pipe line leading to said rear brake cylinders, and a third spring constantly urging said third slide valve in its inoperative closed position.

4. A braking system as set forth in claim 3, which comprises on each one of said second and third slide valves an abutment member pressed by said second and third springs respectively against said distributor body, the abutment member of said second and third slide valves being adapted to hold said slide valves in their inoperative position so as to provide in said common bore a space extending between the registering end faces of said second and third slide valves.

5. A braking system as set forth in claim 4, which comprise an actuator for operating said trailer brake control valve, and a duct formed in said distributor body and adapted to cause the pipe line supplying energizing fluid to said actuator and opening into said second bore, to communicate with said space extending between the registering end faces of said second and third slide valves.

6. A braking system as set forth in claim 3, wherein said rear brake cylinders of said tractor comprise each on the one hand a first bore of relatively small cross-sectional dimension which is connected to the front brake cylinder supply pipe line, first pistons of corresponding diameter slidably fitted in said first relatively small bores for actuating the rear brake control mechanism, and on the other hand a second bore of relatively large cross-sectional dimension which is connected to the rear brake cylinder supply pipe line, and second pistons of corresponding diameter slidably fitted in said bores of relatively large cross-sectional dimension for actuating the rear brakes of the tractor.

References Cited

UNITED STATES PATENTS

| 2,269,054 | 1/1942 | Fitch | 303—7 |
| 2,279,276 | 4/1942 | Oliver | 303—7 |
| 2,675,099 | 4/1954 | Troy. | |
| 3,250,575 | 5/1966 | Shilton | 303—2 |
| 3,284,141 | 11/1966 | Henry-Biabaud | 303—53 XR |

MILTON BUCHLER, *Primary Examiner.*

J. J. McLAUGHLIN, *Assistant Examiner.*